United States Patent
Glazier et al.

(10) Patent No.: US 10,402,868 B1
(45) Date of Patent: Sep. 3, 2019

(54) COMPUTER-BASED SYSTEMS AND METHODS FOR CREATING AND DISTRIBUTING FOOD AND/OR DRINK PROMOTIONS FOR TARGETED CONSUMERS BASED ON BIDS FROM SUPPLIERS AND DATA ABOUT THE TARGETED CONSUMERS

(71) Applicant: Enterra Solutions, LLC, Newtown, PA (US)

(72) Inventors: Jason Glazier, Newtown, PA (US); Steven Sermarini, Schwenksville, PA (US); Stephen F. DeAngelis, Washington Crossing, PA (US)

(73) Assignee: Enterra Solutions, LLC, Newtown, PA (US)

( * ) Notice: Subject to any disclaimer, the term of this patent is extended or adjusted under 35 U.S.C. 154(b) by 0 days.

(21) Appl. No.: 13/909,828

(22) Filed: Jun. 4, 2013

(51) Int. Cl.
*G06Q 30/02* (2012.01)

(52) U.S. Cl.
CPC .............. *G06Q 30/0275* (2013.01)

(58) Field of Classification Search
CPC ................. G06Q 30/0207–30/0277
USPC .................................... 705/14, 319
See application file for complete search history.

(56) References Cited

U.S. PATENT DOCUMENTS

| | | | |
|---|---|---|---|
| 8,065,611 B1* | 11/2011 | Chan | G06Q 30/0224 715/253 |
| 8,271,345 B1 | 9/2012 | Milgrom et al. | |
| 2002/0003166 A1 | 1/2002 | Miller et al. | |
| 2005/0010476 A1 | 1/2005 | Combs | |
| 2007/0118394 A1* | 5/2007 | Cahoon | G06Q 30/02 705/1.1 |
| 2007/0174085 A1* | 7/2007 | Koo | G06Q 10/087 705/2 |
| 2007/0192183 A1 | 8/2007 | Monaco et al. | |
| 2009/0030787 A1 | 1/2009 | Pon et al. | |
| 2010/0153211 A1 | 6/2010 | Ramer et al. | |
| 2010/0174601 A1 | 7/2010 | Yu | |
| 2010/0324978 A1 | 12/2010 | Redmann et al. | |
| 2011/0015984 A1 | 1/2011 | Galinos | |
| 2011/0137718 A1 | 6/2011 | Scroggie et al. | |
| 2012/0271715 A1 | 10/2012 | Morton et al. | |
| 2013/0073366 A1 | 3/2013 | Heath | |
| 2013/0073473 A1 | 3/2013 | Heath | |

FOREIGN PATENT DOCUMENTS

| | | |
|---|---|---|
| WO | WO 2001/077856 A1 | 10/2001 |
| WO | WO 2009/143109 A1 | 11/2009 |

OTHER PUBLICATIONS

ProQuest Dialog Search Results (Year: 2019).*
Newman, "Savoring Success by Expanding the Brand," The New York Times, Sep. 17, 2012 (3 pages).
Duhigg, "How Companies Learn Your Secrets," The New York Times, Feb. 16, 2012 (15 pages).

(Continued)

Primary Examiner — Luis A Brown
Assistant Examiner — Richard G Reinhardt
(74) Attorney, Agent, or Firm — K&L Gates LLP

(57) ABSTRACT

Computer-based systems and methods for creating and distributing food and/or drink promotions to consumers based on bids from suppliers of food and/or drink products and based on data about the targeted consumers.

20 Claims, 4 Drawing Sheets

(56) References Cited

OTHER PUBLICATIONS

Watson, "McCormick on mission to become Amazon of recipes with 'breakthrough' flavor print application," Food navigator-usa.com, Apr. 23, 2012 (2 pages).
Fu, "Ad Auctions with Data," Yahoo! Research (12 pages).
Hansen, "The Economics of Search Engines—Search, Ad Auctions & Game Theory," Master Thesis, Copenhagen Business School, Applied Economics and Finance, 2009, www.issuu.com/jacobhansen/docs/theeconomicsofsearchengines (87 pages).

* cited by examiner

COMPUTER-BASED SYSTEMS AND METHODS FOR CREATING AND DISTRIBUTING FOOD AND/OR DRINK PROMOTIONS FOR TARGETED CONSUMERS BASED ON BIDS FROM SUPPLIERS AND DATA ABOUT THE TARGETED CONSUMERS

BACKGROUND

Cooking recipes commonly list the required ingredients of the recipe. It is known for direct mailings and magazine advertisements to couple a recipe with coupons for one or more of the ingredients in the recipe, or complimentary side dishes. In some instances, the coupons are from different ingredient suppliers and/or manufacturers, e.g., branded consumer packaged good (CPG) food manufacturers. Also, recipe websites are available that commonly have on the site both recipes and coupons for cooking ingredients. In addition, it is known to conduct taste-related surveys of individuals in order to create flavor profiles for the individuals, or to create or enhance the flavor profiles by extracting the taste-related preferences determined by analyzing the user's web clickstream information or from their purchase transactions, such as coming from loyalty card purchase data.

SUMMARY

In one general aspect, the present invention is directed to computer-based systems and methods for creating and distributing food and/or drink ("F&D") promotions to consumers based on bids from suppliers of food and/or drink products and based on data about the targeted consumers. The F&D advertising promotions, or "creatives," may include, in various embodiments, at least one cooking recipe and multiple coupons or other types of price specials or advertisements, with each coupon/special/ad being for a different ingredient of the recipe. For recipes where the cooking instructions are well known, but there might be creative variations on the ingredients (e.g., hamburgers), the promotion may merely identify some of the ingredients for the recipe (without the cooking instructions), and the promotion has coupons, specials or ads for some or all of the ingredients. In other variations, the F&D promotion lists a side dishes (such as for a main course entrée), again where the promotion has coupons, specials or ads for some or all of the side dishes. As used herein, a "side dish" could include a desert, appetizer or a beverage choice that complements or otherwise pairs well with other listed side dishes and/or the main advertised entrée, such as a wine.

The computer system hosts an exchange through which suppliers of F&D items place bids for inclusion in the promotions, and also matches the promotion to particular consumers (the "targeted consumers") based on the preferences of the consumers inferred from consumer data. For example, for a recipe promotion, the computer system determines the ingredients that are needed from the recipes in a recipe database and various ingredient suppliers (e.g., branded CPG foodstuff manufacturers) submit electronic bids for those ingredients. The bids preferably contain a coupon amount (e.g., 10% off) or some other quantitative promotion. The other quantitative promotions could be, for example, an advertising fee the supplier is willing to pay for inclusion in the promotion, particularly where the supplier is not offering a coupon or other type of price discount, or some other quantitative promotion, such as a free item of a second kind, such as a cooking utensil (e.g., a spatula, oven mitt, apron, etc.). The suppliers' bids may also include some constraint on the distribution of the bidder's promotion, such as a maximum quantity of the coupons/specials/ads to be distributed. Based on the received bids for the ingredients or other F&D items to be included in the promotions, the winning bids for the different ingredients and items are determined, and recipes and/or side dish suggestions that are adequate or satisfactory for distribution to targeted consumers are determined. In various embodiments, a recipe or side dish suggestion is adequate for distribution when there are winning bids from a threshold number (e.g., two or more) of ingredients and/or side dishes to be included in the distributed promotion. In some embodiments, the advertising creative distributed to the target consumers may also include non-coupon specials, such as notifications of ongoing sales by a local foodstuff retailer or merely an advertisement (without a coupon) for a foodstuff product (i.e., any food, cooking or beverage item that could be used in a recipe and/or as a side dish).

The target F&D promotion and the targeted consumers are preferably selected based on a degree of matching between the F&D promotion and the targeted consumers. The consumer data on which the matching is performed may include, for example: (i) demographic data about the consumers (e.g., age, residence, ethnicity, income, etc.); (ii) purchase data for the consumers (e.g., from loyalty programs, such for grocery stores, or online purchase data); (iii) web browsing data (e.g., cookie data, such recipe webpages that the consumer visited); and/or (iv) taste preference data for the consumers. In various embodiments, the promotion is distributed using direct mail and/or digital/online advertising (including mobile advertising where appropriate).

In various embodiments, each of the F&D suppliers that participates in such an advertising campaign (e.g., distribution of the F&D promotions) is charged a fee. The fees from the participating suppliers may be allocated to the exchange that manages the bidding exchange and the entities that distribute the ads. This solution is attractive to a F&D supplier for many reasons, including: (1) it does not have to solely pay for the ad campaign, but rather the costs can be shared by all of the participating suppliers; (2) the ads will be attractive to the consumers because the promotions are matched to the consumers preferences; and (3) the combined savings from the multiple coupons will be attractive to the consumers. These and other benefits of the present invention will be apparent from the description below.

FIGURES

Various embodiments of the present invention are described herein by way of example in connection with the following figures, wherein.

DESCRIPTION

Figure 1:
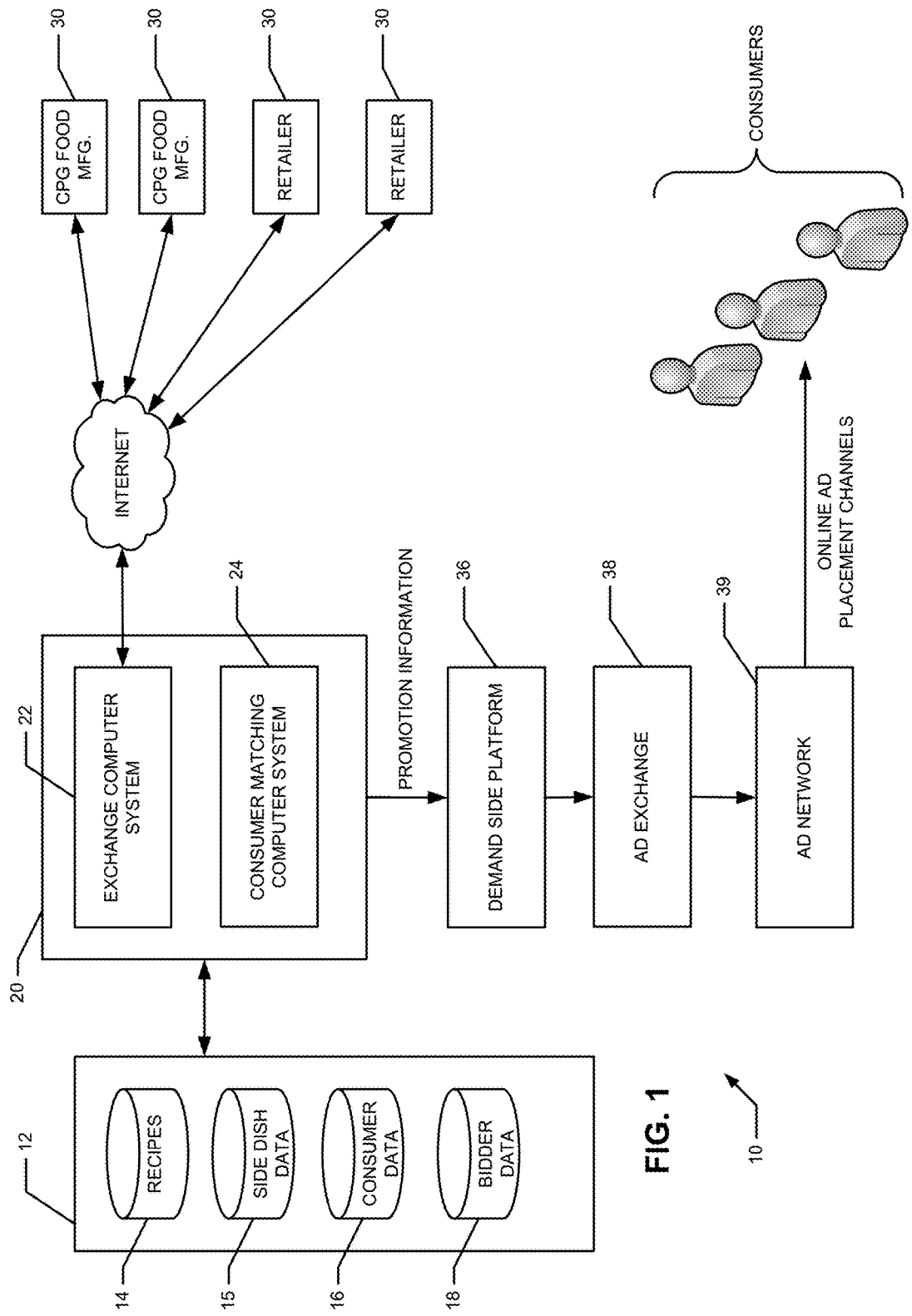
FIG. 1 is a diagram of a computer-based system for distributing the multi-coupon advertising promotions to consumers according to various embodiments of the present invention.

Various embodiments of the present invention are directed generally to computer-based systems and method that facilitate the distribution of recipe-based or other F&D advertising promotions to targeted consumers. In various embodiments, the advertising promotions, or "creatives," preferably include at least one cooking recipe and multiple coupons or other types of sales promotions or specials (sometimes collectively referred to as merely "coupons" herein for convenience and brevity), with each coupon for a different ingredient of the recipe. As used herein, "ingredient" refers to any foodstuff (e.g., foods items, spices, cooking oils, sweeteners, beverage, etc.) used to make a culinary dish, snack, entrée, bread, beverage, or any other type of food item. For example, if ketchup is used in a particular recipe, it would be considered an "ingredient," but so would the constituent components of ketchup (e.g., tomatoes, vinegar, sugar, etc.) be considered ingredients if the recipe was for ketchup, if the recipe called for ketchup to be made from scratch, or if the recipe otherwise called for the constituent ingredients of ketchup. Preferably, the advertising creative includes coupons for at least two of the ingredients of the recipe, and could include coupons for all of the ingredients, although having a coupon for each ingredient is not required. In addition, instead of a coupon or other price special, one or more items in the promotion may merely have an advertisement (without a coupon). In other embodiments, in addition to or in lieu of a recipe, the promotion may list complementary side dishes or food pairings. The complementary side dishes could be for a main course entrée, but they do not have to be; they could just be general food pairings, such as for desert, appetizer, etc., potentially including both food and beverages. A side dish/food pairing advertising promotion may include coupons, price specials, or advertisements for the identified side dishes. Also, the recipe and side dish promotions could be combined in one advertising campaign. That is, in various embodiments, a promotion may have both a recipe for a main entrée, along with coupons and/or advertisement for ingredients in the main entrée, along with one or more complimentary side dishes for the main entrée, with coupons and/or advertisements for the side dishes. Where a side dish is also something that can be prepared at home, the promotion may also include a recipe for the side dish, with coupons and/or advertisement for the ingredients in the side dish. In other embodiments, an event or theme may be listed in the promotion, and various foods or ingredients may be listed that pair with that event or theme. In other embodiments, culinary accessories (e.g. grilling utensils) may be also be paired with a food or event.

Suppliers of F&D items may submit bids for their products for potential inclusion in a promotion. If a bid is a "winning" bid (which may be determined according to different criteria depending on the item and the type of promotion) it will be included in a promotion. The suppliers may be, for example, branded CPG food manufacturers (e.g., Kraft, Heinz, Del Monte, etc.), retail grocery stores (particularly national or regional retail grocers, such as Wal-Mart, Target, Costco, etc.), or any other food, beverage or ingredient supplier. The bidders may submit bids for as many different F&D-related products as they offer. In various embodiments, the bids are not tied to a particular recipe or entrée. Rather, an exchange computer system, described further below, determines the products that are needed for a promotion and the F&D-related product suppliers submit bids for those products. Depending on the bid-for product, the bids may be a coupon amount (e.g., 10% off, or $1 off a specific size of a product), some other quantitative promotion amount (e.g., a "special"), or some compensation going to the exchange for being included within the ad with/without a coupon. In some cases, as mentioned above, the bid could be for a non-coupon advertisement of a product. In addition, the bids may additionally include some constraint(s) on the distribution of the promotion, such as a maximum quantity of the coupons to be distributed and/or a time limitation. Based on the received bids for the F&D-related products, the exchange computer system determines the winning bids for the different F&D-related products. For a recipe-based promotion, the exchange computer system also determines the recipes in the recipe database that are adequate for distribution to targeted consumers. In various embodiments, as described further below, a recipe is adequate for distribution when there are winning bids for a threshold number of ingredients in the recipe. The threshold number could be two or more, as explained further below. In a similar manner, for a promotion advertising a combination of two or more side dishes, the exchange computer system determines the combination of side dishes that is suitable for distribution, again possibly based on whether there are a threshold number of side dish coupons or advertisements to include in the promotion.

In various embodiments, a consumer matching computer system then selects, in the case of recipe-based promotion, an adequate recipe (or recipes) to distribute to one or more targeted consumers. In various embodiments, the consumer matching computer system could first select a target recipe and then determine the target consumers to which the advertising creative (with the recipe and coupons) is to be distributed. In such an embodiment, the consumer matching computer system selects the target consumers based on the recipe as well as data about the consumers (e.g. "consumer data"). The consumer data on which the selections are made may include, for example: (i) demographic data about the consumers (e.g., age, residence, ethnicity, income, etc.); (ii) purchase data for the consumers (e.g., from loyalty programs, such for grocery stores, or online purchase data); (iii) web browsing and other website-related data (e.g., cookie data, such recipe webpages that the consumer visited, printed out, and/or saved); and/or (iv) taste (or flavor) preference data for the consumers. As to this last item, U.S. patent application Ser. No. 13/775,791, filed Feb. 25, 2013 and Ser. No. 13/847,273, filed Mar. 19, 2013, both of which are incorporated herein by reference in their entirety, describe ways of generating flavor profiles for consumers, such as through survey data (e.g., a survey about their flavor preferences) and other data sources, including purchase data (e.g., online and/or loyalty program purchase data) and web browsing data. In another embodiment, the consumer matching computer system may first select the target consumer(s) first, and then select the target recipe for the target consumer (s) based on the target consumer(s) consumer data. In a similar manner, the consumer matching computer system may identify consumers for a combination entrée-side dish advertising promotion.

In either case, once the target recipe(s) and/or side dish combination promotion is selected, an advertising creative is generated. In the case of a recipe promotion, the advertising creative includes, for example, the target recipe(s) and the coupons for two or more ingredients for the recipe. Also, in some embodiments, non-coupon specials could be included in the creative, such as non-coupon advertisements or notifications of ongoing sales that do not require a coupon. For example, if a recipe calls for particular ingredient, say apples, and a grocer has apples on sale (although not by a coupon), information about the grocer's sale could also be included in the creative. The grocers may submit non-coupon sales (or promotion) information for inclusion in the advertising creative via the ingredient exchange, similar to how the coupon bids are submitted. In a situation where the target recipe has a coupon from a food retailer, sales promotions from other, and competing retailers would ordinarily not be included. Also, the computer system may store information about grocer's geographical footprints in a computer database. This information can be used to limit geographically the consumers to which the recipe promotions are distributed. Similarly, for a combination of side dishes, the creative would a listing of one or more complementary side dishes (with or without a specific main course entrée), with coupons or advertisements for the side dishes (or ingredients in the side dishes).

Figure 2:
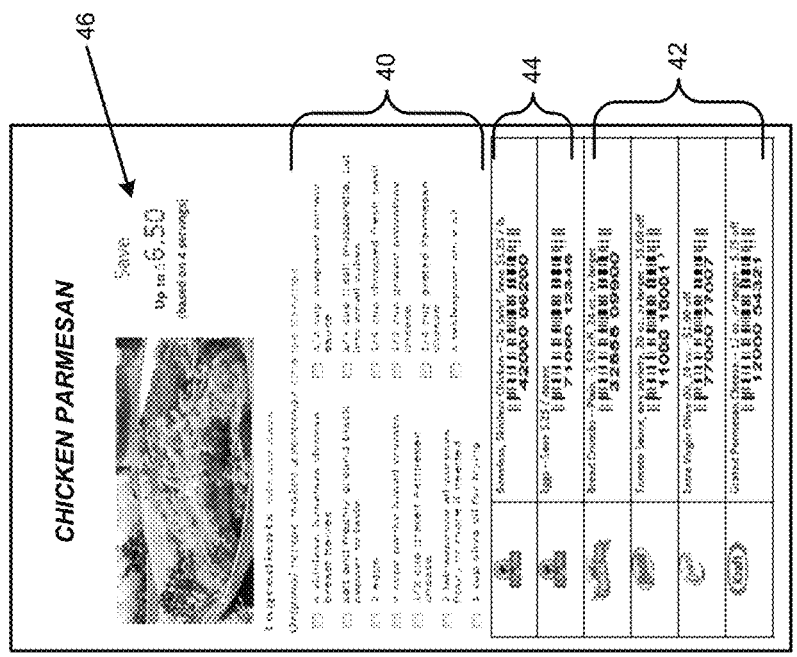
FIG. 2 illustrates aspects of a sample multi-coupon, recipe-based advertising promotion according to various embodiments of the present invention.

FIG. 2 illustrates aspects of a sample recipe advertising creative. The recipe will typically list the ingredients 40 and the cooking instructions (not shown in FIG. 2). The creative will also include the coupons 42 and, in this example, non-coupon specials from a grocer 44. Note that the coupon and non-coupon specials are all for separate ingredients of the recipe so that there is no internal competition within the ad. Also, the total potential, realizable savings 46 may be advertised to enhance the attractiveness of the promotion to the consumers.

The advertising creative can be distributed to the target consumer(s) in any suitable fashion, including direct mail or digital (e.g., online and/or mobile) advertising. In various embodiments, the cost of distributing the advertising (preferably including the fees from the entity(ies) administering the exchange and consumer matching computer systems) is spread across the suppliers and retailers whose coupons and non-coupon promotions are included in the advertising campaign, which provides the advantage that no single supplier or grocer has to fund the entire ad promotion; rather costs can be shared with the others participants. This solution also provides the advantage that the targeted promotions are more attractive to the ingredient suppliers because the recipes and consumers are matched based on the consumer data, thereby heightening the attractiveness of the recipe to the targeted consumers.

FIG. 1 is a diagram of a computer-based system 10 according to various embodiments of the present invention. As shown in FIG. 1, the system includes a computer-based data center 12 that may comprise one or more computer databases, including, for example, the recipe database 14, the side dish database 15, the consumer database 16, and the bidder database 18. The recipe database 14 includes recipe data, including the ingredients, for a plurality of recipes. The side dish database 15 may include a listing of complimentary side dishes (including beverages) for entrees. As described further below, some specific main entrees may have fixed side dishes (e.g., baked potatoes as a side for steak) or there could be dynamic rules to identify side dishes (e.g., a potato side for beef dishes that meet certain criteria). The consumer database 16 includes data about the consumers to which the recipe promotions are to be distributed. This consumer data may include, as mentioned above: (i) demographic data about the consumers (e.g., age, residence, ethnicity, income, etc.); (ii) purchase data for the consumers (e.g., from loyalty programs, such for grocery stores, or online purchase data); (iii) web browsing data (e.g., cookie data, such recipe webpages that the consumer visited); and/or (iv) taste (or flavor) preference data for the consumers. The bidder data 18 may include data about the branded CPG food manufacturers and retailers that participate in the exchange, including information about their geographical footprints where necessary (e.g., for determining local food retailers).

Also as shown in FIG. 1, the system 10 includes a computer system 20 that comprises the exchange computer system 22 and the consumer matching computer system 24. As described in more detail below, the exchange computer system 22 administers the exchange, or auction, through which F&D product suppliers submit bids for potential inclusion in the advertising promotions. The F&D product suppliers, e.g., the bidders, may include branded CPG food manufacturers 30, retail grocers 32, and/or any other supplier of foodstuffs included in cooking recipes and interested in participating in the exchange. As such, in the case of a recipe promotion, the exchange computer system 22 may: (i) determine the ingredients in the recipes in the recipe database 14; (ii) solicit and receive the bids from the bidders 30, 32; (iii) determine winning bids for the different ingredients for the recipes; and (iv) determine recipes that are adequate for distribution. Similarly, in the case of a combination of side dishes, the exchange computer system 22 may: (i) determine the suitable side dishes based on the data in the recipe database 14; (ii) solicit and receive the bids from the bidders 30, 32; (iii) determine winning bids for the side dishes; and (iv) determine side dish combinations that are adequate for distribution. In one embodiment, the winning bids for the various ingredients/side dishes are the bids that provide the deepest discounts, although in other embodiments different considerations may be used to determine the winning bidder, as described further below.

As explained above, in various embodiments, a recipe is adequate for distribution when there are winning bids for a threshold number of ingredients in the recipe. The winning bids may be determined as described further below, and could all be from the same ingredient supplier (e.g., where one supplier wins bids for multiple ingredients, such as pasta, pasta sauce, and cheese) or from multiple ingredient suppliers. The threshold number could be two or more, and may be set based on both (i) the cost of distributing the advertisement creative to the targeted consumers and (ii) the advertising fees charged to the ingredient suppliers whose winning bids are included in the advertising promotion. For example, a recipe is adequate for distribution if the collective advertising fees charged to the ingredient suppliers whose winning bids are included in the advertising promotion is greater than the cost to distribute the advertisement (with the difference being the compensation for the entity (ies) administering the ingredient exchange (e.g., the computer system 20)). For example, if it costs $X to distribute the advertising creative with a particular recipe, and each ingredient supplier with a winning coupon bid that could be included in the creative for the recipe is charged $(0.3)X, then at least four winning bidders would be needed so that the collective fees from the winning bidders (here, $(1.2)X) for the recipe exceeds the cost ($X) to distribute the recipe-based advertising creative, with the ingredient exchange administrator/owner being compensated $(0.2)X for its contribution. If the collective fees from the winning bids for a particular recipe do not exceed the cost to distribute the advertisement, that particular recipe is not adequate for distribution. As shown in the example above, this solution may be attractive to the ingredient suppliers because individually they only have to pay a portion (in this example, 30%) of the cost of the campaign. Further, when non-coupon specials for the retailers are included (see 44 of FIG. 2), the additional advertising fees from including these specials in the ad enhance further the revenue for the ingredient exchange.

A similar analysis may be used when side dish suggestions are involved. If the promotion includes just side dish suggestions (i.e., no recipes), the side dish combination may be adequate for distribution when there are winning bids for a threshold number of side dishes (e.g., two or more) to cover the cost of the ad placement. Similarly, for promotions that include both recipes and side dish suggestions, the promotions may be adequate for distribution where there are winning bids for a threshold number of recipe ingredient and side dishes to cover the cost of ad placement.

Where there are variable advertising costs in distributing the promotion and/or variable fees charged to the ingredient suppliers associated with winning bids, the adequacy of the promotion for distribution may be determined based on the average cost of the ad placement and/or the average fees charged to the ingredient suppliers that are winning bidders. There are many different pricing models for the ad placement that could be used, including:

Cost-per-mile (CPM)—cost per one thousand impressions
Cost-per-click (CPC)—The recipient consumer must click an online ad to get the coupons
Cost-per-action (CPA)—The consumer must print or save the coupon, or take some other recognizable action relative to the coupons
Pay-per-sale (PPS)—The consumer tenders the coupon at a retailer.

Any of these pricing models may be used depending on the distribution channel used for the promotion.

The bidders 30, 32 may submit their bids, for example, through a secure, webpage portal administered by the ingredient exchange computer system 22 or through some other secure, TCP-based network protocol. In various embodiments, the bidding ingredient suppliers may update their bids whenever the exchange is open, and the exchange uses the most recent acceptable (e.g., authenticated) bids from the bidding ingredient suppliers to determine the current winning bids for the ingredients. In other embodiments, bidding may be open for various time windows, where the winners are selected after closing of the time window. In various embodiments, the bidding may be blind (i.e., sealed bids where bidders do not see the other bidders' bids) or open (bidders can see other bidder's bids). Also, the auctions can have multiple rounds where the winners after each round are identified (such as on the website for the exchange).

As described above, the bids may include coupon bids or non-coupon advertisement bids. In the case of a non-coupon advertisement bid, the supplier bids a price to pay to include their product in the promotion, although not with a coupon or other price special (e.g., "Use XYZ brand flour"); the higher the price paid the more likely to win. In the case of coupon (or other price special) bids, the bids may include, for example, among other things, a promotion amount and at least one distribution constraint. The promotion amount may be a fixed savings coupon for a given size of product (e.g., save $1 off a 12 oz. jar or larger), or some other discount amount for at item or group of items commonly associated with a typical coupon, such as x % off the normal price or buy some quantity get another quantity free (buy one get one free). The distribution constraint may be a quantity of coupons/promotions that the bidding ingredient supplier is willing to offer in a campaign. For example, suppose a supplier of Romano cheese submits a coupon bid of 10% off, limited to 500 such coupons. If that bid is the winning bid for Romano cheese, and a selected target recipe calls for Romano cheese, the campaign would only include 500 ad placements/impressions with that recipe and with the ingredient supplier's Roman cheese coupon. After the 500 ads are distributed, the second best bid for Romano cheese would be elevated to the current winning bid, and so on, until the ingredient suppliers update their bids. Because of the quantity limits and/or geographical constraints, the same recipe may appear in different campaigns with different participating ingredient suppliers. In the case of multiple winning bids for an ingredient, both (or all) of the winning bids may be used. For example, if two Romano cheese suppliers submit bids for 10% off, each with a distribution limitation of 500, then the campaign may include 500 promotions with one Romano cheese supplier and 500 promotions with the other Romano cheese supplier (although preferably both versions are not distributed to the same target customer). Also, in cases where there is some other constraint of the distribution of a winning bid (e.g., the ingredient supplier with the winning bid does not want to be included in a promotion with certain other CPG manufacturers or retailers; examples of such other constraints are described below), the second best bid may be used in the campaign when the first winning bid cannot.

The distribution constraint could also include a time constraint; for example, the coupon associated with the bid is not to be distributed after (and/or until) some date in the future. The distribution constraint may also include other constraints as described below, include geographical and competitive constraints. A geographical constraint may be, for example, a zip code area(s), a telephone area code(s), a state(s), etc. Also, as mentioned above, non-coupon specials from geographically constrained grocers may be included in the creative. If such geographical constraints are present in a recipe promotion that is direct mailed to consumers, the recipe promotion is only directly mailed to consumers with mailing addresses in the designated geographical area. Similarly, if the recipe promotion is digitally distributed, it may only be distributed to consumers whose IP addresses correspond to the designated geographic area.

The consumer matching computer system 24 matches adequate recipes or combination entrée-side dishes (as the case may be) with one or more consumers for distribution. The matching is performed based on the consumer data 16 so that the promotions are attractive to the target consumers (or the consumers will have a propensity to like or an interest in the recipe or combination entrée-side dishes). In various embodiments, the consumer matching computer system 24 may first select one of the adequate recipes (or combination entrée-side dishes) and then select one or more consumers for that recipe (or combination entrée-side dishes) based on the consumers' preferences. Alternatively, the consumer matching computer system 24 may first select one or more consumers, and then select a recipe (or combination entrée-side dishes) based on the preferences of those consumers. As mentioned above, the consumer data may include different types of data, from which the consumers' preferences are inferred. This data may include: (i) demographic data about the consumers (e.g., age, residence, ethnicity, income, etc.); (ii) purchase data for the consumers (e.g., from loyalty programs, such for grocery stores, or online purchase data); (iii) web browsing or other website-related data (e.g., cookie data, such recipe webpages that the consumer visited, printed, saved, and/or other webpage actions performed); and/or (iv) taste (or flavor) preference data for the consumers. The consumer matching computer system 24 may use one or more of these data sources, depending on what is available, to determine the attractiveness of a recipe (or combination of side dishes) for a consumer. For example, based on demographic data, the consumer matching computer system 24 may infer that consumers in certain geographic locations prefer foods associated with that geographic location (e.g., consumers in Louisiana might prefer Cajun food). Similarly, the consumer matching computer system 24 may infer that consumers like certain foods based on their ethnicity, and so on.

Using the consumers' purchase data, the recipe matching system 24 may infer that consumers prefer foods that contain the food items the consumers typically purchase. For example, if from a consumer's grocery store loyalty program purchase data it is known that the consumer purchase a lot of chicken, the consumer matching system 24 may infer that the consumer might find a chicken recipe attractive. Similarly, regarding web page data, particularly from recipe web sites, the consumer matching system 24 may infer that if the consumer viewed a Thai recipe on the recipe web site, the consumer might find Thai recipes attractive. The consumers' taste/flavor profiles may be the most valuable data in assessing the consumers' attractiveness for the various recipes and entrees. To the extent a consumer's taste/flavor preference data are available, recipes (or combination entrée-side dishes) that complement the consumer's taste/flavor profile may be selected. U.S. patent application Ser. No. 13/775, 791, filed Feb. 25, 2013 and Ser. No. 13/847,273, filed Mar. 19, 2013, mentioned and incorporated above, provide more details about determining a consumer's taste/flavor profile and how to select recipes that complement the consumer's profile.

The consumer matching computer system 24 may use any suitable algorithm for scoring a consumer's preference for a recipe (or combination entrée-side dishes) in order to determine whether there is a sufficient match, e.g., whether the recipe (or combination entrée-side dishes) will be attractive to the consumer. In one embodiment, the consumer matching computer system 24 computes, for a consumer-recipe combination, a demographic score, a purchase data score, a web browsing score, and a taste/flavor preference score based on the consumer's data and the ingredients in the recipe. The consumer's score for that recipe (or combination entrée-side dishes) may then be a weighted average of the scores. Preferably, the scores most indicative of a consumer's preference for a recipe (or combination entrée-side dishes), such as the consumer's taste/flavor preferences, are weighted greater that scores for data types that are less indicative of the consumer's preferences (e.g., demographic data).

Once the target recipe and/or combination of side dishes (with associated coupons) is selected, the advertising creative may be created. The advertising creative may be created automatically (e.g., by computers), semi-manually or manually, and may highlight (or not) the recipe, the associated coupons, and/or the overall potential savings. Once the advertising creative is created and the target consumers identified, the creative is distributed to the targeted consumers, such as by direct mail or digital/online advertising. FIG. 1 shows an embodiment using digital/online advertising. The creatives are given to a demand side platform (DSP) 36, which works with an ad exchange 38 and ad network 39 to distribute the creatives through a suitable online channel (e.g., email, web page ads, pop-ups, adver-gaming, mobile etc.). As such, the same promotion may appear through multiple delivery channels which allow for personal targeting (e.g., both direct mail and digital, or different digital channels). In one embodiment, if the user then clicks on the ad served from the ad network 39, that click information is recorded and can help inform the consumer matching computer system 24 and the DSP 36 in the selection and serving of future ads.

Figure 3:
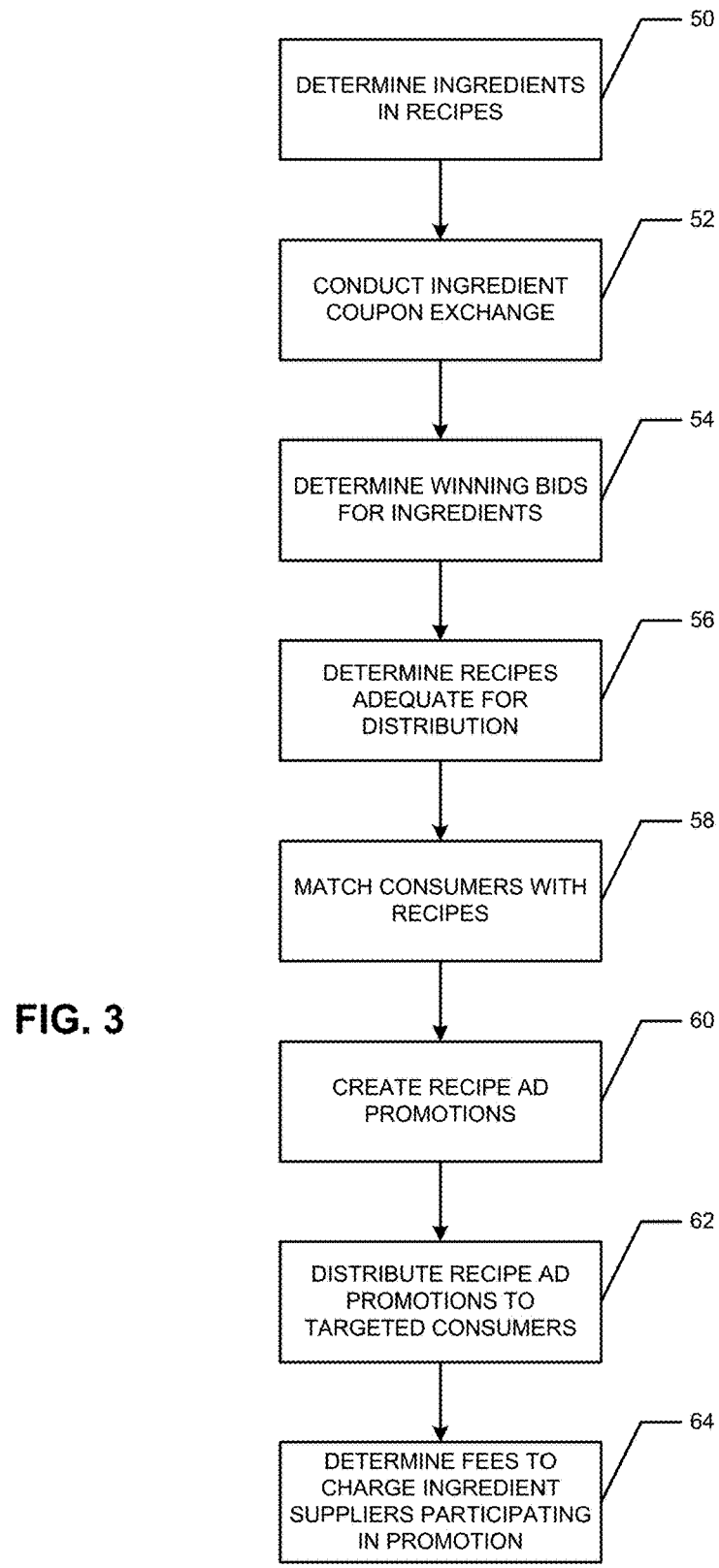
FIGS. 3 and 4 are flow charts of process flows for the multi-coupon advertising promotion computer-based system according to various embodiments of the present invention.

FIG. 3 is a diagram of a process flow for creating and distributing the recipe-based ad promotions to consumers according to various embodiments. Example process flows for side dish promotions are described further below in connection with FIG. 4. As described above, at step 50 the exchange computer system 22 may determine the various ingredients required by the recipes stored in the recipe database 14 and, at step 52, conduct an exchange for the ingredients through which the exchange computer system 22 solicits are receives bids from ingredient supplier bidders 30, 32. In various embodiments, therefore, the ingredient suppliers are not bidding for their coupons to be included with particular recipes, but rather the ingredient suppliers are merely offering to have their coupons included with any selected recipe that calls for their ingredients.

At step 54, the exchange computer system 22 determines the winning bid for the various ingredients of the recipes. The participating ingredient suppliers' bids may be scored so that the winning bids can be determined (e.g., the highest score). The bids may be expressed in any suitable form, which may vary by ingredient depending on how the ingredient is normally sold (e.g., by container, by weight, by volume, etc.) For example, the bidders may bid the amount of the coupon savings, which may be based on a total coupon value (e.g., x % off or x cents off) or on coupon value per measure of weight or volume (e.g., $x/lb. or $x/cu. ft.) Also, in various embodiments, the bidders may bid on the amount they will offer to pay the exchange administrator to include them in the recipe promotion (e.g., the percentage of the ad charge-back cost, with higher percentages being more likely to win). In another embodiment, the bidders may bid on the total number of coupons they have to offer (e.g., the higher the number the more likely to win). Also, a branded CPG food manufacturer may bid to merely brand (or advertise) an ingredient in the recipe, without a coupon offer (essentially a coupon offer of $0 off), which may nevertheless be a winning bid in certain circumstances (such as if there are no other bids for that ingredient), and inclusion in the promotion without a coupon may still be valuable to the branded CPG food manufacturer for advertising purposes. The winning bidder may be determined based on one or a combination of these or other factors. In a simple example, the winning bids are the bids that provide the deepest discount. In more complex scenarios, the winning bid has the highest score from a number of weighted factors, such as discount amount, ad fees to be paid, quantity, etc.

The exchange 22 may also permit more expressive bids in various embodiments. For example, the bidders may attach other conditions to their bids that affects whether their bids might be included in a recipe promotion. Other such conditions, and combination of such conditions, may include:

A brand lockout where one brand does not want to participate in a group coupon promotion with a competitor brand(s).

An ingredient supplier may condition its participation on having certain ingredients in the recipe; otherwise the ingredient supplier does not participate. For example, an ingredient supplier of both pasta and pasta sauce may place bids for both its pasta and pasta sauce, but if a recipe called for just pasta, and not pasta sauce, the ingredient supplier would not want its coupon included in the recipe promotion.

An ingredient supplier may require some subset of its coupons be redeemed for the consumer to get the savings. For example, if an ingredient supplier has two coupons in a recipe promotion, for two different ingredients in the recipe, the coupons may specify that the consumer has to purchase both of the ingredients to realize the coupon savings.

A branded ingredient supplier may only want to participate with certain retailers (or not participate with certain or any retailers).

An ingredient supplier may only want to participate in certain types of pricing models for the advertisements (e.g., cost-per-mile (CPM), cost-per-click (CPC), cost-per-action (CPA), etc.).

An ingredient supplier may have restrictions on media outlets or distribution channels for the promotions (e.g., no ads on adult content web sites).

An ingredient supplier may have restrictions on the rate paid for the campaign, since it will be paying a portion of the ad costs for the campaign.

An ingredient supplier may restrict the geographic distribution of its coupons, as mentioned above.

An ingredient supplier may restrict the type of consumer targeted. For example, no alcohol promoted to underage consumers.

When these conditions are present, they may be another consideration on determining the winning bids, determining whether a recipe is adequate for distribution, determining a consumer match for a recipe, or a limitation on the distribution of the promotions, depending on the applicable condition.

Referring back to FIG. 3, at step 56, based on the determined winning bids for the various ingredients of the recipes, the exchange computer system 22 determines the recipes that are adequate for distribution. As described above, a recipe may be adequate for distribution when there are winning bids from the ingredient suppliers for a threshold number of ingredients in the recipe, such that the collective fees charged to the ingredient suppliers for inclusion of their coupons sufficiently exceed the cost of distributing the recipe promotion (e.g., with the ingredient exchange owner receiving the excess). At step 58, the consumer matching computer system 24 may then match the recipes that are adequate for distribution with targeted consumers, as described above. The matching algorithm attempts to prioritize the recipes that will be as attractive as possible to the consumer. Some examples of considerations include: foods they like the taste of, the current season or holiday, prior recipes shown (vary the recipes shown), local specials, their history of buying (as some of the items may already be in their pantry), their prior history of clicking on prior ads served, and so on. The recipe ad promotions may be created at step 60 (which may include non-coupon promotions, such as sales notifications, as described above), and the ads are distributed to the target consumers at step 62. In some embodiments, step 60 may precede step 58. In various embodiments, once the ad promotion is served, the administrator of the exchange would be charged for the ad based on the applicable rate. The exchange administrator in turn may then allocate the charge among the participants in the ad campaign, e.g., the branded CPG food manufacturers and the food retailers. Also, the applicable distribution constraints in the bids would limit the number of impressions sent by the ad network 39. For example, if one winning bid had a quantity limit of 500 impressions, and that was the lowest remaining quantity of any winning ingredient bid in the recipe promotion, the distributions of the recipe promotion would be limited 500 impressions.

According to various embodiments, there may also be limitations or restrictions on the consumers' use/redemption of the coupons. These restrictions may include, for example, according to various embodiments:

Use of the coupons is unrestricted, so that each coupon is able to be redeemed independently.

All coupons need to be redeemed in one transaction to get the value of any of them (all or nothing).

One or more subsets of multiple coupons may be grouped together such that a group of ingredients must be purchased to realize the savings for that group. For example, pasta and past sauce coupons may be grouped together so that the consumer has to buy both the pasta and past sauce to use the coupons for the pasta and pasta sauce.

There may be a minimum number of coupons that have to be redeemed to realize any of the coupon savings (e.g., three of eight coupons in the promotions must be redeemed to realize any savings).

For the above restrictions where multiple coupons must be used to realize savings (e.g., all or some subset of the ingredient coupons), there may still be some discounted savings if less than the required amount is used. For example, if a promotion groups four coupons together such that the consumer has to redeem all four coupons to realize the full benefit of the coupons' savings, if the customer only purchases two of the four items, the consumer may still realize some fraction (e.g., 50%) of the full savings.

Returning in FIG. 3, at step 64 the fees to charge the ingredient suppliers whose coupons are included in the promotion are determined, based on the cost of placing and distributing the ads. In various embodiments, the exchange computer system 22 computes the fees. As described above, there are different pricing models that could be used for the ad placement. Different methods for allocating the fees to the participating ingredient suppliers may be used depending on the pricing model for the ad placement. For example, where the ad placement costs are CPM charges and there are N participating ingredient suppliers in the recipe promotion, different possible ways of allocating the CPM charges among the N participating ingredient suppliers, including:

A fixed cost to each participating ingredient suppler. For example, each participating ingredient supplier may pay $1 per CPM. If ad placement costs $2.25 per CPM, and three participating ingredient suppliers paid $1 each per CPM, there would be $0.75 profit for the exchange administrator.

A cost that varies based on the number of ingredient suppliers participating in the promotion, where the cost goes down with more ingredient suppliers.

A straight percentage of the ad placement cost to each participating ingredient supplier. For example, each participant may pay 40% of the ad placement cost. If there are three participants, the additional 20% may go to the administrator of the ingredient exchange.

The ad exchange may be compensated on either a fixed cost or variable cost basis that may or may not be tied to the cost of the advertisement. For example, the ad exchange may be given a fixed dollar amount for arranging the promotion, a fixed percentage of the CPM may be charged, and so on. In this case the fees charged by ad network would be split in some way (e.g. proportionately) among the participants.

The revenue of the ingredient exchange accruing to the administrator/owner may be from any number of sources, including: (1) fixed or variable fees based on marking up the ad costs as described above; (2) fixed charge for each campaign; (3) fixed or variable fees related to platform access (e.g., access for placing bids), such as subscription fees, membership fees, and/or infrastructure fees; (4) a food retailer may pay a fee or percentage of coupon redemptions since the ad campaign drove sales for the retailer; and/or (5) credits, incentives and rebates from the upstream advertiser ecosystem (e.g., the ad network 39) for bringing volume to the ad network platform and/or achieving various business level milestones.

Note that various steps in FIG. 3 may be performed in different orders. For example, the creatives may be created (step 60) before, after, or contemporaneous with the matching of the consumers with the recipes (step 58). Other changes in the order of the steps may also be used in other embodiments of the present invention.

Figure 4:
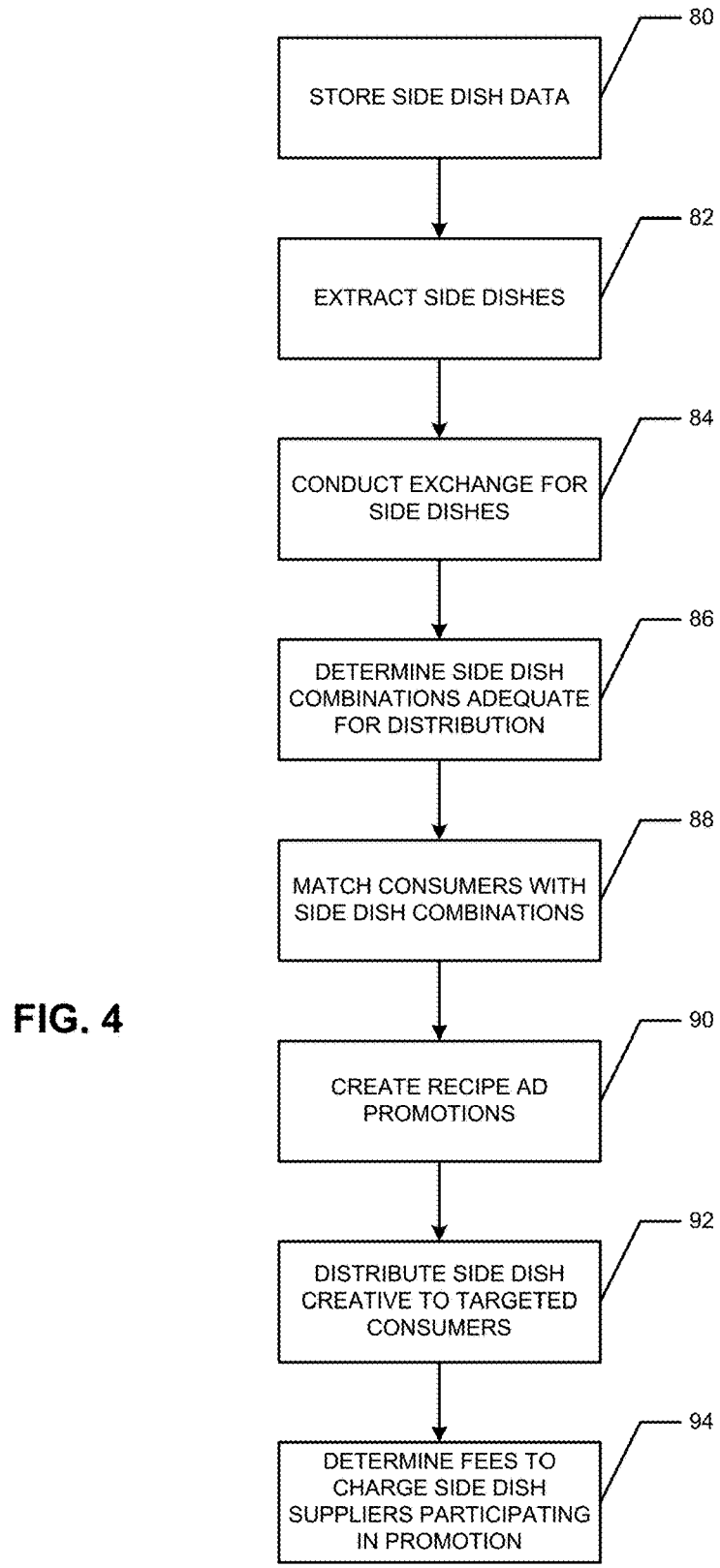

As mentioned before, in addition to or in combination with the promotions for ingredients of a recipe, aspects of the present invention may be used to suggest side dishes (or more generally "food pairings") for consumers. The side dishes may be, for example, entrée sides, deserts, beverages (including wine or other alcoholic beverages), etc. FIG. 4 is a diagram of the process flow used by the computer system 20 according to one embodiment to create and distribute the side dish ads. At step 80, the side dish database 15 stores lists of one or more side dishes that pair well with or are otherwise associated with a food (e.g. entrée). At step 82, the exchange computer system 22 may extract the side dishes in the database 15 so that the F&D suppliers can bid on each of the side dishes through the exchange at step 84. The exchange computer system 22 determines the various side dish winners at step 84; the winners may be determined similarly as described above for the recipe/ingredients example (e.g., biggest discount and/or other considerations). At step 86, the exchange computer system 22 determines a listing of side dishes that are adequate for distribution. As before, a listing of side dishes may be considered adequate for distribution when the collective advertising fees for the listed side dishes from the side dish suppliers (and other sponsorship when present) exceed the ad placement fees. At step 88, the consumer matching computer system 24 matches the side dish listings with consumers based on the consumer data (e.g., taste profile data, demographic data, purchasing history data, etc.) to determine which side dish listings to distribute to which consumers. The goal and considerations of the matching algorithm may be similar as for the recipe promotions, although the algorithm itself could be different for the side dish promotion. Some examples of considerations for the side dish promotion include: foods they like the taste of, the current season or holiday, prior side dishes shown (do not keep showing the same foods), local specials, their history of buying so some of the items may already be in their pantry, their prior history of clicking on prior ads served, and so on. Then the side dish combination creative may be created (step 90) and distributed to the targeted consumers (step 92). In some embodiments step 90 may precede step 88. Also, the fees of the participating F&D suppliers for the side dish combination ad campaign are determined (step 94).

The side dishes to be listed within the bidding exchange may be determined in any suitable manner. For example, some side dishes may have a fixed association (e.g., stored in the database 15) for certain other foods (e.g., side A is a good pair for food B) and/or side dish matching rules may be used. For example, a fixed association could be that French Fries pair well with a hamburger. A side dish matching rule may be an association rule(s) that dynamically determine the side dish pairings. One simple example dynamic association rule is: "French Fries pair with a food that contains beef and where the ethnicity is American or European, unless the meat is within a dish that contains pasta." In this example, therefore, a coupon or advertisement for a French Fry product brand may be included in the campaign as a side dish in a listing of side dishes that pair well with beef.

In one embodiment a CPG company, such as a wine manufacturer, may want to just pay an advertising fee to suggest a wine pairing for some of the foods in the database (e.g., "For your T-Bone steak on sale, we suggest XYZ brand Merlot," which may not include any additional couponing). In this case, multiple versions of a T-Bone ad may be created—one for different types of wines (e.g., merlot, Cabernet, etc.). The consumer matching computer system 24 may then pick the best match for the targeted consumer (e.g., infer the type of wine that the consumer prefers based on the consumer data). One other embodiment may produce a "Place holder" type ad where the decision to use a wine in the campaign is made earlier (e.g., at step 86, a place holder for wine is in the ad), but the exact wine choice is delayed until the matching step with the consumer (step 88 instead of step 86 in FIG. 4). This avoids the potential problem of needing to produce multiple ad combinations, one for each wine, that may be matched with a consumer. Although this particular example uses wine, it could equally apply to virtually any food or beverage. For example, there may be a placeholder for a potato side, but the exact potato side by the winning bidder may be chosen later in the process based on the consumers' preferences.

The computer system 20 (see FIG. 1) may be implemented with one or more networked computer devices, such as servers, workstations, PCs, laptops, etc., each comprising, for example, one or more processors and memory units (e.g., primary storage device, such as RAM and ROM, and secondary storage devices, such as Flash, SSD, HDDs, etc.). Also, the ingredient exchange computer system 22 and the recipe matching computer system 24 may comprise separate computer systems (each with their own processors and memory units), or they could be implemented with one integrated computer system. The memory unit(s) of the computer system(s) may store instructions (e.g., software) for execution by the processor(s). For example, the memory unit(s) may store software, that when executed by the processor(s), cause the processor(s) to: administer the ingredient exchange, including soliciting and receiving the bids, and determining the winning bids for the various ingredients; determining the recipes that are adequate for distribution; and matching a target recipe with target consumers based on the recipe and the consumer data.

The data center 12, including the databases 14, 15, 16, 18, may be implemented with one or more database management systems and memory for storing the data of the databases, including, for example, solid state and/or disk arrays (e.g., RAID). The databases 14, 16, 18 may be local and/or remote (e.g., cloud). In addition, each ingredient supplier that places bids through the bid exchange may having one or more client computer devices (e.g., servers, work stations, PCs, laptops, etc.) for communicating electronically through a computer network (e.g., the Internet) with the ingredient exchange computer system 22. Each client computer device may comprise one or more processors and one or more memory units.

Similarly, the demand-side platform (DSP) 36, the ad exchange 38, and ad network 39, may be implemented as computer-based systems for facilitating the distribution and placement of the ads. They may communicate via computer networks (e.g., the Internet) and may be in communication with the computer system 20. For digital advertisements, the ad network 39 may be in communication with web sites that host the advertisements for the selected consumers, and/or may email the consumers with the advertisements.

Various embodiments of the present invention are, therefore, directed to computer systems and methods for creating and distributing the advertising creatives. According to various embodiments, a computer system according to an embodiment of the present invention comprises a data storage system that stores data comprising foodstuff-related data. The foodstuff-related data can comprise (i) ingredient data for ingredients for a plurality of recipes (e.g., recipe database 14) or (ii) side dish data for a variety of foods (e.g., side dish database 15). The data storage system also stores consumer data for a plurality of consumers. In addition, the computer system is programmed to receive bids from a plurality of food and/or drink item suppliers. The bidders may submit bids from client computer devices that are in communication with the computer system, such as via the Internet. The received bids comprise an advertisement promotion (e.g., a coupon or a bid to brand an item in the promotion without a coupon) for food and/or drink items offered by the food and/or drink item suppliers. Each bid may be for a single food or drink item The computer system also selects both a target food-related promotion (e.g., a recipe promotion and/or a side dish combination promotion) and one or more consumers ("the target consumers") for distribution of an advertising promotion pertaining to the selected food-related promotion. The computer system selects the target food-related promotion based on at least the foodstuff-related data (e.g., the recipes or side dish data) and the bids received from the plurality of food and/or drink item suppliers. The target food-related promotion may be selected based on at least whether there is at least one bid from the plurality of food and/or drink item suppliers for a threshold number of different food and/or drink items related to the target food-related promotion. The computer system is programmed to determine a winning bid for each of at least the threshold number of different food and/or drink items related to the target food-related promotion, and the target consumers are selected based on the consumer data. The advertising creative is distributed to the target consumers, and the advertising creative comprises both: information pertaining to the target food-related promotion; and the winning advertisement promotion for each of at least the threshold number of different food and/or drink items related to the target food-related promotion.

As mentioned above, the food-related promotion may comprises a recipe, in which case the advertising creative may comprise both the recipe and coupons for two or more of the ingredients of the recipe, where the coupons correspond to winning bids (however they are determined) from the food and/or drink item suppliers. The advertising creative may also comprise at least one non-coupon advertisement for an additional ingredient of the recipe. That non-coupon advertisement could be a notification of an ongoing sale for the additional ingredient or an advertisement for a brand of the additional ingredient. Also as mentioned above, the food-related promotion may comprises a listing of multiple side dishes, in which case the advertisement creative may comprise coupons for two or more of the side dishes, where the coupons correspond to winning bids from the food and/or drink item suppliers.

The received bids from the plurality of food and/or drink item suppliers may further comprise at least one constraint on distribution of the advertising promotion for the food and/or drink item. That constraint may comprise a constraint on a quantity of the advertising promotions are to be distributed.

The computer system may comprise: (i) an exchange computer system for receiving the bids from the plurality of the food and/or drink item suppliers; and (ii) a consumer matching computer system for selecting both the target food-related promotion and the one or more consumers for distribution of the advertising creatives. The exchange computer system may be programmed to: receive the bids from the food and/or drink item suppliers; determine one or more winning bids for food and/or drink items; and identify one or more food-related promotions from the foodstuff-related data that are adequate for distribution in an advertising campaign based on the one or more winning bids for the food and/or drink items. The advertising creatives may be distributed to the target consumers using direct mail and/or digital advertising.

In general, it will be apparent to one of ordinary skill in the art that at least some of the embodiments described herein may be implemented in many different embodiments of software, firmware, and/or hardware. The software and firmware code may be executed by a processor or any other similar computing device. The software code or specialized control hardware that may be used to implement embodiments is not limiting. For example, embodiments described herein may be implemented in computer software using any suitable computer software language type, using, for example, conventional or object-oriented techniques. Such software may be stored on any type of suitable computer-readable medium or media, such as, for example, a magnetic or optical storage medium. The operation and behavior of the embodiments may be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the processes associated with the present embodiments may be executed by programmable equipment, such as computers or computer systems and/or processors. Software that may cause programmable equipment to execute processes may be stored in any storage device, such as, for example, a computer system (nonvolatile) memory, an optical disk, magnetic tape, or magnetic disk. Furthermore, at least some of the processes may be programmed when the computer system is manufactured or stored on various types of computer-readable media.

It can also be appreciated that certain process aspects described herein may be performed using instructions stored on a computer-readable medium or media that direct a computer system to perform the process steps. A computer-readable medium may include, for example, memory devices such as diskettes, compact discs (CDs), digital versatile discs (DVDs), optical disk drives, or hard disk drives. A computer-readable medium may also include memory storage that is physical, virtual, permanent, temporary, semipermanent, and/or semitemporary. A "computer," "computer system," "host," "server," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software modules used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable media. Further, the various databases described herein may be implemented using, for example, disk storage systems and/or in-memory databases, such as the SAP HANA in-memory database system.

In various embodiments disclosed herein, a single component may be replaced by multiple components and multiple components may be replaced by a single component to perform a given function or functions. Except where such substitution would not be operative, such substitution is within the intended scope of the embodiments. Any servers described herein, for example, may be replaced by a "server farm," cloud computing environment, or other grouping of networked servers (such as server blades) that are located and configured for cooperative functions It can be appreciated that a server farm or cloud computing environment may serve to distribute workload between/among individual components of the farm or cloud, as the case may be, and may expedite computing processes by harnessing the collective and cooperative power of multiple servers. Such server farms or clouds may employ load-balancing software that accomplishes tasks such as, for example, tracking demand for processing power from different machines, prioritizing and scheduling tasks based on network demand and/or providing backup contingency in the event of component failure or reduction in operability.

The computer systems may comprise one or more processors in communication with memory (e.g., RAM or ROM) via one or more data buses. The data buses may carry electrical signals between the processor(s) and the memory. The processor and the memory may comprise electrical circuits that conduct electrical current. Charge states of various components of the circuits, such as solid state transistors of the processor(s) and/or memory circuit(s), may change during operation of the circuits.

Some of the figures may include a flow diagram. Although such figures may include a particular logic flow, it can be appreciated that the logic flow merely provides an exemplary implementation of the general functionality. Further, the logic flow does not necessarily have to be executed in the order presented unless otherwise indicated. In addition, the logic flow may be implemented by a hardware element, a software element executed by a computer, a firmware element embedded in hardware, or any combination thereof.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A system, comprising:
    a consumer sensory profile system, comprising:
        a central aggregate sensory profile computer system; and
        a plurality of sensory preference computer systems, wherein each sensory preference computer system is located remotely from the central aggregate sensory profile computer system, and wherein each sensory preference computer system, as a different consumer data source, comprises:
            a local database that stores consumer data intrinsic to the respective sensory preference computer system, wherein the intrinsic consumer data comprises at least one of food preference survey data, purchase data, or web-browsing history data associated with each consumer of a plurality of consumers; and
            a local flavor profile determination engine programmed to:
                generate a local flavor profile data set for each consumer of the plurality of consumers based on the intrinsic consumer data stored in the local database, wherein the local flavor profile data set includes a numeric value for each of two or more than two food flavor categories, wherein each food flavor category is associated with a respective $N^{th}$ percentile, and wherein the numeric value for each food flavor category is a score associated with the intrinsic consumer data at the respective $N^{th}$ percentile for the respective category; and
                transmit the generated local flavor profile data set to the central aggregate sensory profile computer system, wherein the local flavor profile data set does not include the intrinsic consumer data of the respective sensory preference computer system; and
        wherein the central aggregate sensory profile computer system comprises a flavor profile aggregation engine programmed to generate aggregate flavor profile data for each consumer of the plurality of consumers based on a plurality of local flavor profile data sets received from the plurality of sensory preference computer systems;
    a computer-based data center, comprising:
        a recipe database including recipe data for a plurality of available recipes, wherein the recipe data comprises ingredient data associated with each available recipe; and
        a consumer database including data associated with the plurality of consumers, wherein the data comprises demographic data, purchase data, web-browsing data, and flavor preference data for each of the plurality of consumers, and wherein the flavor preference data comprises aggregate flavor profile data generated by the central aggregate sensory profile computer system;
    a plurality of ingredient supplier computer systems;
    an administrator computer system communicatively coupled with the computer-based data center, wherein the administrative computer system comprises:
        an ingredient exchange computer system programmed to:
            determine, based on the ingredient data associated with the available recipes in the recipe database of the computer-based data center, ingredients in each available recipe;
            solicit bids, via an electronic communication network, from the ingredient supplier computer systems, wherein each solicited bid is associated with a determined ingredient;
            receive bids, via the electronic communication network, from the ingredient supplier computer systems, wherein each received bid comprises a supplier promotion, and wherein the determined ingredient associated with each received bid is not tied to any particular recipe of the available recipes;

determine, from the received bids, a winning bid for each ingredient based on the supplier promotion associated with each received bid;

determine, from the available recipes stored in the recipe database, at least one recipe that is adequate for distribution, wherein the determining comprises:

evaluating a number of ingredients in each available recipe that have received a winning bid; and determining that a particular recipe of the available recipes is adequate for distribution when a threshold number of different ingredients in that particular recipe have received a winning bid; and a consumer matching computer system programmed to:
select an adequate recipe from the at least one recipe determined as adequate for distribution;
determine, based on the ingredient data associated with the selected recipe in the recipe database of the computer-based data center, ingredients in the selected recipe;
compute a score indicative of each consumer's preference for the selected recipe, wherein each consumer score is based at least on the respective consumer's aggregate flavor profile data in the consumer database of the computer-based data center and the determined ingredients in the selected recipe; and
select at least one consumer to receive the selected recipe based on each consumer's preference score; and an online advertising system to distribute an advertising creative to the at least one selected consumer, wherein the advertising creative comprises the selected recipe and the supplier promotion associated with each received bid for each ingredient of the selected recipe that received a winning bid.

2. The system of claim 1, wherein the supplier promotion associated with each received bid comprises a coupon, a price special, or an advertisement, and wherein the advertising creative comprises:
coupons for two or more than two different ingredients of the selected recipe, wherein the coupons correspond to received bids that received winning bids.

3. The system of claim 2, wherein the advertising creative further comprises at least one non-coupon advertisement for an additional ingredient of the selected recipe.

4. The system of claim 3, wherein the at least one non-coupon advertisement comprises a notification of an ongoing sale for the additional ingredient.

5. The system of claim 3, wherein the at least one non-coupon advertisement comprises an advertisement for a brand of the additional ingredient.

6. The system of claim 1, wherein the advertising creative further comprises:
a plurality of side dishes; and
coupons, price specials, or advertisements for two or more than two of the side dishes.

7. The system of claim 1, wherein each received bid is for a single ingredient.

8. The system of claim 1, wherein each received bid further comprises at least one distribution constraint and wherein the ingredient exchange computer system is further programmed to:
determine, from the received bids, the winning bid for each ingredient further based on the at least one distribution constraint associated with each received bid.

9. The system of claim 8, wherein the at least one distribution constraint comprises a constraint on a quantity of the supplier promotion, associated with each received bid, to be distributed.

10. The system of claim 8, wherein the at least one distribution constraint comprises a constraint on other ingredient suppliers that participate in the advertising creative.

11. The system of claim 1, wherein the supplier promotion associated with each received bid for a first determined ingredient comprises a coupon with a discount amount, and wherein the ingredient exchange computer system is programmed to determine, from the received bids, the winning bid for the first determined ingredient based on the discount amount associated with each received bid.

12. The system of claim 11, wherein the advertising creative comprises:
the coupon associated with the winning bid for the first determined ingredient; and
an advertisement for a second determined ingredient.

13. The system of claim 12, wherein the advertisement for the second determined ingredient comprises an advertisement for a brand of the second determined ingredient.

14. The system of claim 12, wherein the advertisement for the second determined ingredient comprises a notification of an ongoing sale by a retailer.

15. The system of claim 14, wherein the at least one selected consumer is geographically proximate to the retailer.

16. The system of claim 1, wherein the local flavor profile determination engine is further programmed to generate the local flavor profile data set for each consumer of the plurality of consumers based on the intrinsic consumer data stored in the local database, wherein the local flavor profile data set further includes a numeric value for each of two or more than two food texture categories, wherein each food texture category is associated with a respective $N^{th}$ percentile, and wherein the numeric value for each food texture category is a score associated with the intrinsic consumer data at the respective $N^{th}$ percentile for the respective category.

17. The system of claim 1, wherein the threshold number is based on:
a cost of distributing the advertising creative; and
collective advertising fees chargeable to ingredient suppliers having winning bids associated with the advertising creative.

18. The system of claim 17, wherein the threshold number is a number at which the collective advertising fees associated with the winning bids exceeds the cost of distributing the advertising creative.

19. The system of claim 1, wherein the plurality of available recipes comprise main-course entrée recipes and side dish recipes.

20. The system of claim 1, wherein the consumer matching computer system is programmed to compute the score indicative of each consumer's preference for the selected recipe further based on the respective consumer's web-browsing data in the consumer database of the computer-based data center, wherein the online advertising system is programmed to record a click of the distributed advertising creative by the at least one selected customer, and wherein the consumer matching computer system is programmed to compute future scores indicative of the at least one selected customer's preference for the selected recipe further based on the recorded click.

\* \* \* \* \*